(12) United States Patent
Lee et al.

(10) Patent No.: US 9,371,892 B2
(45) Date of Patent: Jun. 21, 2016

(54) POWER TRANSMISSION SYSTEM OF HYBRID ELECTRIC VEHICLE

(71) Applicant: Hyundai Motor Company, Seoul (KR)

(72) Inventors: Changwook Lee, Suwon-Si (KR); Kangsoo Seo, Yongin-Si (KR); Horim Yang, Yongin-Si (KR); Donghwan Hwang, Seoul (KR); Jongsool Park, Hwaseong-Si (KR); Wonmin Cho, Hwaseong-Si (KR)

(73) Assignee: Hyundai Motor Company, Seoul (KR)

( * ) Notice: Subject to any disclaimer, the term of this patent is extended or adjusted under 35 U.S.C. 154(b) by 21 days.

(21) Appl. No.: 14/558,963

(22) Filed: Dec. 3, 2014

(65) Prior Publication Data

US 2015/0369343 A1  Dec. 24, 2015

(30) Foreign Application Priority Data

Jun. 24, 2014  (KR) ........................ 10-2014-0077580

(51) Int. Cl.
*B60K 6/365* (2007.10)
*F16H 3/72* (2006.01)

(52) U.S. Cl.
CPC ............... *F16H 3/728* (2013.01); *B60K 6/365* (2013.01); *F16H 2200/201* (2013.01); *F16H 2200/2038* (2013.01); *Y10S 903/919* (2013.01)

(58) Field of Classification Search
CPC ... B60K 6/365; F16H 3/728; F16H 2200/201; F16H 2200/2038
USPC .............................................. 475/5, 275–291
See application file for complete search history.

(56) References Cited

U.S. PATENT DOCUMENTS

| 8,313,402 | B2 * | 11/2012 | Park | B60K 6/365 475/275 |
| 8,672,789 | B2 * | 3/2014 | Park | B60K 6/365 475/282 |
| 2006/0148605 | A1 * | 7/2006 | Raghavan | F16H 3/728 475/5 |
| 2006/0276288 | A1 * | 12/2006 | Iwanaka | B60K 6/365 475/5 |
| 2007/0021258 | A1 * | 1/2007 | Conlon | B60K 6/365 475/5 |
| 2011/0300982 | A1 * | 12/2011 | Park | B60K 6/365 475/5 |
| 2011/0312461 | A1 * | 12/2011 | Park | B60K 6/365 475/5 |
| 2015/0377327 | A1 * | 12/2015 | Lee | F16H 3/727 475/5 |

FOREIGN PATENT DOCUMENTS

| DE | 102012024173 A1 * | 6/2014 | ............ B60K 6/365 |
| JP | 4007403 B1 | 11/2007 | |
| JP | 2011-105296 A | 6/2011 | |
| JP | 2013-001385 A | 1/2013 | |
| KR | 10-2012-0140099 A | 12/2012 | |

* cited by examiner

*Primary Examiner* — Roger Pang
(74) *Attorney, Agent, or Firm* — Morgan, Lewis & Bockius LLP (57) ABSTRACT

A power transmission system of a hybrid electric vehicle includes an input shaft a first planetary gear set disposed on the input shaft while having a first sun gear, a first planetary carrier, and a first ring gear, a second planetary gear set having a second sun gear, a second planetary carrier, and a second ring gear, a third planetary gear set having a third sun gear, a third planetary carrier, and a third ring gear, first to sixth rotation shafts and three friction elements selectively connect the respective rotation shafts to each other or selectively connect the respective rotation shafts to the transmission housing.

14 Claims, 7 Drawing Sheets

| Mode | Shift stage | Friction element | | |
|---|---|---|---|---|
| | | BK1 | BK2 | CL1 |
| EV | 1ST | ● | | |
| | 2ND | | | ● |
| HEV | 1ST | ● | | |
| | 2ND | | | ● |
| | 3RD | | ● | |
| ENG | 1ST | ● | ● | |
| | 2ND | | ● | ● |

POWER TRANSMISSION SYSTEM OF HYBRID ELECTRIC VEHICLE

CROSS-REFERENCE TO RELATED APPLICATION

The present application claims priority to and the benefit of Korean Patent Application No. 10-2014-0077580 filed on Jun. 24, 2014, the entire contents of which is incorporated herein for all purposes by this reference.

BACKGROUND OF THE INVENTION

1. Field of the Invention

The present invention relates to a power transmission system of a hybrid electric vehicle, and more particularly, to a power transmission system of a hybrid electric vehicle capable of suppressing conversion into an ENG mode by providing sufficient power performance at the time of wide open throttle (WOT) oscillation and maximally using power of an engine at the time of conversion into a first HEV mode and a third HEV mode.

2. Description of Related Art

An environmentally-friendly technology of a vehicle is a core technology which controls a survival of a future automobile industry and advanced car makers have focused their own energy on the development of an environmentally-friendly vehicle to achieve environment and fuel efficiency regulations.

Therefore, each car maker has developed an electric vehicle (EV), a hybrid electric vehicle (HEV), a fuel cell electric vehicle (FCEV), and the like, as a future vehicle technology.

As described above, since the future vehicle has several technical restrictions such as weight, cost, and the like, the car makers have paid attention to the hybrid electric vehicle as an alternative to solve realistic problems such satisfaction of exhaust gas regulations and enhancement of fuel efficiency performance and are fiercely competing to commercialize the hybrid electric vehicle.

The hybrid electric vehicle is a vehicle using more than two power sources and may be combined in several ways. Here, as the power source, a combination of a gasoline engine or a diesel engine using traditional fossil fuel and a motor/generator driven by electrical energy is used.

The hybrid electric vehicle may be implemented as an EV mode driven only by a motor, an HEV mode simultaneously using the engine and the motor, and an ENG mode using only the engine, depending on a combination of an engine and a motor.

Further, the hybrid electric vehicle drives a power generator using kinetic energy of a vehicle, instead of using idle stop stopping the engine at the time of stopping the vehicle and using braking by the existing friction at the time of braking the vehicle. In this case, it is possible to more remarkably enhance fuel efficiency than the typical vehicle due to fuel saving, and the like by regenerative braking to store electrical energy generated by the driving of the power generator in a battery and reuse the stored electrical energy at the time of driving.

As described above, a power transmission system of a hybrid electric vehicle is classified into a single mode scheme and a multi-mode scheme.

The single mode scheme may not require torque transfer mechanisms, such as a clutch and a brake, for a shift control, but may have reduced efficiency at the time of high-speed driving and thus low fuel efficiency and require an additional torque amplifier for applying to a large vehicle.

The multi-mode scheme may have high efficiency at the time of high-speed driving and may be designed to amplify a torque, and as a result, may be applied to a medium and large size vehicle.

Recently, therefore, the multi-mode scheme rather than the single mode scheme has been mainly adopted and thus a study thereon has been actively conducted.

The power transmission system based on the multi-mode scheme is configured to include a plurality of planetary gear sets, a plurality of motors/generators used as a motor and a power generator, a plurality of torque transfer mechanisms (friction elements) which may control rotation elements of the planetary gear set, a battery used as the power source of the motor/generator, and the like.

The power transmission system based on the multi-mode scheme has different operation mechanisms depending on a connection configuration of the planetary gear set, the motor/generator, and the toque transfer mechanism.

Further, the power transmission system based on the multi-mode scheme is different in durability, power transmission efficiency, a size, and the like depending on the connection configuration, and therefore in the field of the power transmission system of the hybrid electric vehicle, research and development to implement more robust, compact power transmission system without power loss has been continued.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission system of a hybrid electric vehicle having advantages of suppressing conversion into an ENG mode by providing sufficient power performance at the time of wide open throttle (WOT) oscillation and maximally using power of an engine at the time of conversion into a first HEV mode and a third HEV mode.

Further, various aspects of the present invention are directed to providing a power transmission system of a hybrid electric vehicle having advantages of reducing an electrical load by increasing an usage of a mechanical power transfer path to use large power of an engine, reducing a mode conversion frequency by replacing an ENG mode at the time of oscillation, and minimizing a change in a rotation speed of all the rotation elements at the time of mode conversion.

In addition, various aspects of the present invention are directed to providing a power transmission system of a hybrid electric vehicle having advantages of providing a drivable ENG mode without an electrical load of a motor/generator to enhance fuel efficiency at the time of high-speed driving.

An aspect of the present invention provides a power transmission system of a hybrid electric vehicle, including an input shaft configured to be input with power of an engine, an output gear configured to be disposed on the input shaft without rotation interference, a first planetary gear set configured to be disposed on the input shaft while including three rotation elements configured of a first sun gear, a first planetary carrier, and a first ring gear, a second planetary gear set configured to be disposed on the same shaft line as the first planetary gear set while including three rotation elements configured of a second sun gear, a second planetary carrier, and a second ring gear, a third planetary gear set configured to be disposed on the same shaft line as the second planetary gear set while including three rotation elements configured of a third sun gear, a third planetary carrier, and a third ring gear, a first rotation shaft configured to directly connect one of the rotation elements of the first planetary gear set to a first motor/generator, a second rotation shaft configured to be directly connected to the output gear while directly connecting one of the rotation elements of the first planetary gear set ruled out from the rotation elements connected to the first rotation shaft to one of the rotation elements of the second planetary gear set, a third rotation shaft configured to be directly connected to the input shaft while directly connecting one of the rotation elements of the first planetary gear set ruled out from the rotation elements connected to the first rotation shaft or the second rotation shaft to one of the rotation elements of the third planetary gear set, a fourth rotation shaft configured to be directly connected to a second motor/generator while directly connecting one of the rotation elements of the second planetary gear set ruled out from the rotation elements connected to the second rotation shaft to one of the rotation elements of the third planetary gear set ruled out from the rotation elements connected to the third rotation shaft, a fifth rotation shaft configured to be connected to one of the rotation elements of the second planetary gear set ruled out from the rotation elements connected to the second rotation shaft or the fourth rotation shaft so as to be selectively connected to a transmission housing, a sixth rotation shaft configured to be connected to one of the rotation elements of the third planetary gear set ruled out from the rotation elements connected to the third rotation shaft or the fourth rotation shaft so as to be connected to a transmission housing, and three friction elements configured to selectively connect the respective rotation shafts to each other or selectively connect the respective rotation shafts to the transmission housing.

All of the first, second, and third planetary gear sets may be configured of a single pinion planetary gear set and may include the first rotation shaft configured to directly connect the first sun gear to the first motor/generator, the second rotation shaft configured to be connected to the output gear while directly connecting the first planetary carrier to the second planetary carrier, the third rotation shaft configured to be connected to the input shaft while directly connecting the first ring gear to the third planetary carrier, the fourth rotation shaft configured to be connected to the second motor/generator while directly connecting the second sun gear to the third ring gear, the fifth rotation shaft configured to be connected to the second ring gear, and the sixth rotation shaft configured to be connected to the third sun gear.

The three friction elements may include a first brake configured to selectively connect the fifth rotation shaft to the transmission housing, a second brake configured to selectively connect the sixth rotation shaft to the transmission housing, and a first clutch configured of a direct connection means of the second planetary gear set and configured to selectively connect the fourth rotation shaft to the fifth rotation shaft.

The three friction elements may include a first brake configured to selectively connect the fifth rotation shaft to the transmission housing, a second brake configured to selectively connect the sixth rotation shaft to the transmission housing, and a first clutch configured of a direct connection means of the second planetary gear set and configured to selectively connect the second rotation shaft to the fifth rotation shaft.

The three friction elements may include a first brake configured to selectively connect the fifth rotation shaft to the transmission housing, a second brake configured to selectively connect the sixth rotation shaft to the transmission housing, and a first clutch configured to be a direct connection means of the second planetary gear set and selectively connect the second rotation shaft to the fourth rotation shaft.

Further, in connection with the first brake, the second brake, and the first clutch, in EV mode 1, the first brake may be operated, in EV mode 2, the first clutch may be operated, in HEV mode 1, the first brake may be operated, in HEV mode 2, the first clutch may be operated, in HEV mode 3, the second brake may be operated, in ENG mode 1, the first brake and the second brake may be operated, and in ENG mode 2, the first clutch and the second brake may be operated.

The first planetary gear set may be configured of a double pinion planetary gear set and the second and third planetary gear sets may be configured of a single pinion planetary gear set and the first, second, and third planetary gear sets may include the first rotation shaft configured to directly connect the first sun gear to the first motor/generator, a second rotation shaft configured to be connected to the output gear while directly connecting the first ring gear to the second planetary carrier, a third rotation shaft configured to be connected to the input shaft while directly connecting the first planetary carrier to the third planetary carrier, the fourth rotation shaft configured to be connected to the second motor/generator while directly connecting the second sun gear to the third ring gear, the fifth rotation shaft configured to be connected to the second ring gear, and the sixth rotation shaft configured to be connected to the third sun gear.

The first and third planetary gear sets may be configured of a single pinion planetary gear set and the second planetary gear set may be configured of a double pinion planetary gear set and the first, second, and third planetary gear sets may include the first rotation shaft configured to directly connect the first sun gear to the first motor/generator, the second rotation shaft configured to be connected to the output gear while directly connecting the first planetary carrier to the second ring gear, the third rotation shaft configured to be connected to the input shaft while directly connecting the first ring gear to the third planetary carrier, the fourth rotation shaft configured to be connected to the second motor/generator while directly connecting the second sun gear to the third ring gear, the fifth rotation shaft configured to be connected to the second planetary carrier, and the sixth rotation shaft configured to be connected to the third sun gear.

The first and second planetary gear sets may be configured of a single pinion planetary gear set and the third planetary gear set may be configured of a double pinion planetary gear set and the first, second, and third planetary gear sets may include the first rotation shaft configured to directly connect the first sun gear to the first motor/generator, the second rotation shaft configured to be connected to the output gear while directly connecting the first planetary carrier to the second planetary carrier, the third rotation shaft configured to be connected to the input shaft while directly connecting the first ring gear to the third ring gear, the fourth rotation shaft configured to be connected to the second motor/generator while directly connecting the second sun gear to the third planetary carrier, the fifth rotation shaft configured to be connected to the second ring gear, and the sixth rotation shaft configured to be connected to the third sun gear.

According to the exemplary embodiments of the present invention, in the overall configuration, the two EV modes, the three HEV modes, and the two ENG modes may be implemented by the combination of the three planetary gear sets, the three friction elements, and the two motors/generators.

Further, according to the exemplary embodiments of the present invention, a larger torque than an engine torque may be transmitted to the output shaft to increase the usage of the mechanical power transfer path and to use the larger engine power than the specification of the same first motor/generator.

Further, according to the exemplary embodiments of the present invention, the larger torque than the engine torque may be transmitted to the output shaft to perform the high rotation operation with the high engine power at the same vehicle speed at the time of WOT oscillation and obtain the larger acceleration.

Further, according to the exemplary embodiment of the present invention, since in the HEV mode, the larger acceleration than the ENG mode may be obtained, a necessity of conversion into the ENG mode at the time of oscillation is removed to configure the relatively simple system and reduce the friction element depending on the mode reduction, thereby more increasing the efficiency.

Further, it is possible to perform the driving without the electrical load of the first and second motors/generators by providing the ENG mode at the time of the high-speed driving, thereby improving the fuel efficiency.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

However, portions unrelated to the description will be omitted in order to obviously describe exemplary embodiments of the present invention, and same or similar reference numerals will be used to describe same or similar components throughout the present specification.

In the following description, the reason of differentiating names of components into a first, a second, and the like is to differentiate components having the same name and therefore an order thereof is not necessarily limited thereto.

Figure 1:
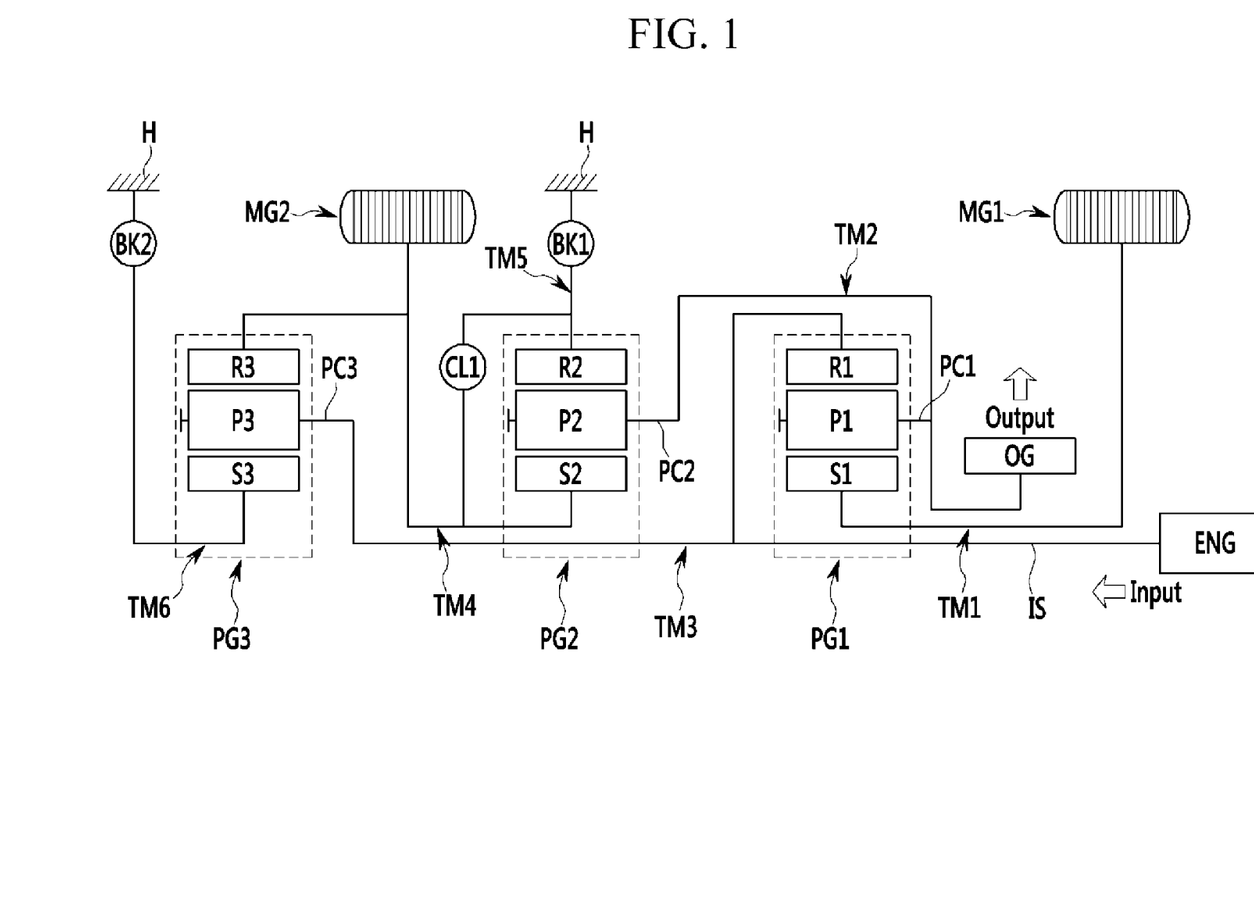
FIG. 1 is a configuration diagram of a power transmission system according to various exemplary embodiments of the present invention.

FIG. 1 is a configuration diagram of a power transmission system according to a first exemplary embodiment of the present invention.

Referring to FIG. 1, a power transmission system according to an exemplary embodiment of the present invention is configured of a combination of first, second, and third planetary gear sets PG1, PG2, and PG3, first and second motors/generators MG1 and MG2, and three friction elements BK1, BK2, and CL1.

The first planetary gear set PG1 is configured of a single pinion planetary gear set and includes a first sun gear S1, a first ring gear R1, and a first planetary carrier PC1 which supports a first pinion P1 externally meshed between the first sun gear S1 and the first ring gear R1.

The second planetary gear set PG2 is configured of the single pinion planetary gear set and includes a second sun gear S2, a second ring gear R2, and a second planetary carrier PC2 which supports a second pinion P2 externally meshed with between the second sun gear S2 and the second ring gear R2.

The third planetary gear set PG3 is configured of the single pinion planetary gear set and includes a third sun gear S3, a third ring gear R3, and a third planetary carrier PC3 which rotatably supports a third pinion P3 externally meshed with between the third sun gear S3 and the third ring gear R3.

The first, second, and third planetary gear sets PG1, PG2, and PG3 are sequentially disposed on the same shaft line from an engine (ENG) and include six rotation shafts TM1 to TM6 while any one rotation element of the first planetary gear set is directly connected to any one rotation element of the third planetary gear set and any one rotation element of the second planetary gear set is directly connected to another rotation element of the third planetary gear set.

In more detail, the first planetary carrier PC1 of the first planetary gear set PG1 is directly connected to the second planetary carrier PC2 of the second planetary gear set PG2, the second sun gear S2 of the second planetary gear set PG2 is directly connected to the third ring gear R3 of the third planetary gear set PG3, and the third planetary carrier PC3 of the third planetary gear set PG3 is directly connected to the first ring gear R1 of the first planetary gear set PG1, and the first, second, and third planetary gear sets include six rotation shafts TM1 to TM6.

The first rotation shaft TM1 directly connects the first sun gear S1 to the first motor/generator MG1.

The second rotation shaft TM2 directly connects the first planetary carrier PC1 to the second planetary carrier PC2, and at the same time, is directly connected to an output gear OG, and thus is continuously operated as an output element.

The third rotation shaft TM3 is directly connected to an input shaft IS while directly connecting the first ring gear R1 to the third planetary carrier PC3 and thus is continuously operated as the input element.

The fourth rotation shaft TM4 directly connects the second sun gear S2 to the third ring gear R3 and is also directly connected to the second motor/generator MG2.

The fifth rotation shaft TM5 is connected to the second ring gear R2 and is selectively connected to a transmission housing H and thus is operated as a fixed element.

The sixth rotation shaft TM6 is connected to the third sun gear S3 and is selectively connected to the transmission housing H and thus is operated as a fixed element.

The first motor/generator MG1 and the second motor/generator MG2 each have the motor and generator functions as an independent power source.

The first motor/generator MG1 serves as a motor which is directly connected to the first rotation shaft TM1 to supply rotation power or serves as a power generator which generates electricity while rotating by a torque of the first rotation shaft TM1.

The second motor/generator MG2 serves as a motor which is directly connected to the fourth rotation shaft TM4 to supply rotation power or serves as a power generator which generates electricity while rotating by a torque of the fourth rotation shaft TM4.

The first and second brakes BK1 and BK2 among the friction elements are a friction element selectively connecting the rotation element (rotation shaft) to the fixed element (transmission housing) and the first clutch CL1 is a friction element selectively connecting among the rotation elements and may be configured of multi-plate type hydraulic friction elements which are friction-coupled with each other by oil pressure.

The first brake BK1 is disposed to selectively connect the fifth rotation shaft TM5 to the transmission housing H and the second brake BK2 is disposed to selectively connect the sixth rotation shaft TM6 to the transmission housing H.

The first clutch CL1 interconnects two of the three rotation shafts TM2, TM4, and TM5 including three rotation elements of the second planetary gear set PG2, and thus the second planetary gear set PG2 is in a direct connection state and FIG. 1 illustrates that the first clutch CL1 is disposed between the fourth rotation shaft TM4 and the fifth rotation shaft TM5.

FIG. 1 illustrates that the input shaft IS, the third rotation shaft TM3, and the sixth rotation shaft TM6 are disposed on the same shaft line and thus the input shaft IS and the third rotation shaft TM3 are considered as the same shaft but the exemplary embodiment of the present invention is not limited thereto, and therefore the third rotation shaft TM3 and the sixth rotation shaft TM6 are set as a hollow shaft and thus may be disposed at an outer circumferential portion of the input shaft IS without rotation interference.

Further, FIG. 1 illustrates that the engine ENG is disposed in front of the first planetary gear set PG1 but the exemplary embodiment of the present invention is not limited thereto, and therefore the engine ENG may be disposed in back of the third planetary gear set PG3.

Figure 2:
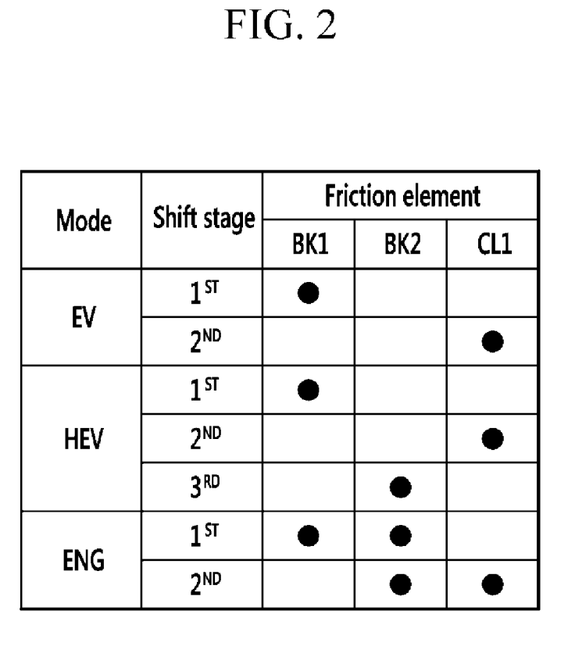
FIG. 2 is an operation table for each operation mode of the friction elements which are applied to the power transmission system according to the various exemplary embodiments of the present invention.

FIG. 2 is an operation table for each operation mode of the friction elements which are applied to the planetary gear train according to the first exemplary embodiment of the present invention.

Referring to FIG. 2, an operation state of the friction elements for each operation mode will be described below.

In EV mode 1, the first brake BK1 is operated and in EV mode 2, the first clutch CL1 is operated.

In HEV mode 1, the first brake BK1 is operated, in HEV mode 2, the first clutch CL1 is operated, and in HEV mode 3, the second brake BK2 is operated.

Further, in the ENG mode 1, the first and second brakes BK1 and BK2 are operated and in the ENG mode 2, the second brake BK2 and the first clutch CL1 are operated.

As described above, the power transmission system according to the first exemplary embodiment of the present invention may implement two EV modes, three HEV modes, and two ENG modes.

Hereinafter, an operation principle for each mode will be described below.

[EV Mode 1]

The EV mode is a mode which supplies power of the battery to the motor/generator in the state in which the engine stops to drive the vehicle with the power of the motor/generator.

The EV mode may have a large effect on enhancement of fuel efficiency since the engine stops and perform reverse driving without a separate reverse apparatus and is operated at the time of starting and low-speed driving after stopping and requires a deceleration shift ratio which makes a power source more rapidly rotate than an output member for preventing a vehicle from sliding back on an uphill road or rapid acceleration of the vehicle.

Under the condition, in the EV mode 1, the operation of the second motor/generator MG2 is controlled in the state in which the fifth rotation shaft TM5 is operated as the fixed element by the operation of the first brake BK1 to perform a deceleration output depending on a gear ratio of the second planetary gear set PG2 while performing an input to the fourth rotation shaft TM4.

[EV Mode 2]

The motor/generator has efficiency which is changed depending on a rotation speed and a torque, which means that a conversion ratio into mechanical energy of the rotation and the torque among electrical energy even though the same current is supplied is different.

That is, a current of the battery used in the EV mode is energy accumulated by combustion of fuel in the engine or regenerative braking and efficiently using the accumulated energy independent of the generated path is directly connected with the enhancement of fuel efficiency.

For this reason, recently, the electric vehicle is inclined to have a transmission of at least two stages and even in the EV mode, the hybrid electric vehicle preferably has a transmission of at least two stages, and therefore even in the exemplary embodiment of the present invention, the hybrid electric vehicle is considered to have the EV mode 2.

In consideration of this aspect, describing the shift process of the EV mode 2, in the EV mode 2, a vehicle speed is increased during the driving in the EV mode 1 and thus the operation of the first brake BK1 is released at the place where the efficiency of the second motor/generator MG2 is poor and the operation of the first clutch CL1 is controlled.

Then, the first clutch CL1 which is the direct connection device of the second planetary gear set PG2 is operated and therefore the second planetary gear set PG2 is in a direct connection state, such that all the rotation shafts TM2, TM4, and TM5 output an input to the second planetary gear set while rotating at the same speed.

[HEV Mode 1]

In the HEV mode 1, the power of the engine is transmitted to the output member through a mechanical path and an electrical path, and the power distribution is performed by the planetary gear set, and the engine and the motor/generator connected to the planetary gear set may arbitrarily control the rotation speed independent of the vehicle speed and therefore may serve as an electronically controlled continuously variable transmission.

Therefore, the typical transmission has a fixed engine speed and torque with respect to the given vehicle speed, while the electronically controlled continuously variable transmission may freely change the engine speed and the torque, thereby maximizing the operation efficiency of the engine and enhancing the fuel efficiency.

In consideration of this aspect, in the EV mode 1, the second rotation shaft TM2 of the first planetary gear set PG1 is restricted by being connected to the output gear OG and the rest first and third rotation shafts TM1 and TM3 freely rotate.

Therefore, after the engine (ENG) starts using the first motor/generator MG1, the speed of the engine ENG and the first motor/generator MG1 may be controlled independent of the vehicle speed.

[HEV Mode 2]

According to the exemplary embodiment of the present invention, an input branch mode may be set into two, a rotation speed ratio of the engine and the motor/generator with respect to the vehicle speed may be generally set into two by changing the gear ratio of the second planetary gear set PG2, and a level of the rotation speed with respect to each rotation element is reduced as a whole, thereby helping enhance the fuel efficiency.

In the EV mode 2, only the second rotation shaft TM2 of the first planetary gear set PG1 is restricted by being connected to the output gear OG and the rest first and third rotation shafts TM1 and TM3 freely rotate.

Therefore, when the engine ENG and the first motor/generator MG1 are controlled, the speed of the engine ENG and the first motor/generator MG1 may be controlled in a continuously variable way independent of the vehicle speed.

Further, when the first motor/generator MG1 rotates counterclockwise, the first motor/generator MG1 serves as the generator and when the first motor/generator MG1 rotates clockwise (in this case, the engine ENG has a more reduced rotation speed than before), the first motor/generator MG1 serves as the motor.

As such, since the engine ENG and the first motor/generator MG1 may be controlled in the continuously variable way if necessary, it is possible to exhibit excellent performance in the fuel efficiency and the power performance.

[HEV Mode 3]

In a hybrid input branch mode, the rotation speed of the motor/generator connected to the output member is restricted to the vehicle speed and therefore it is difficult to efficiently operate the motor/generator and reduce capacity.

In particular, when the vehicle speed is increased and thus the rotation speed of the motor/generator restricted to the vehicle speed is increased, the efficiency of the motor/generator is reduced and thus the optimal fuel efficiency may not be achieved.

Under this condition, when all of the engine ENG and the two motors/generators MG1 and MG2 may control the rotation speed independent of the vehicle speed by coupling the first planetary gear set PG1 connected to the engine ENG with two different rotation elements of the second planetary gear set PG2 connected to the output gear OG, the continuously variable transmission function is operated once again to promote the enhancement of fuel efficiency.

Therefore, when the second brake BK2 is operated, the speed and torque of the second motor/generator MG2 are restricted to the speed and torque of the engine ENG by the third planetary gear set PG3 and the first planetary gear set PG1 and the second planetary gear set PG2 are connected to each other by the second rotation shaft TM2, such that the speed and the torque may be restricted to each other.

Further, the first and second motors/generators MG1 and MG2 need to have mutual electrical energy balance and all the rotation elements of the first and second planetary gear sets PG1 and PG2 perform an electrically controlled continuously variable transmission function while having interrelationship with the speed and the torque.

[ENG Mode 1]

A core technology to enhance the fuel efficiency of the hybrid electric vehicle may be said to be a recovery and reuse of braking energy and a free control of an operation point of the engine.

Further, to control the operation point of the engine, twice energy conversion processes of a process of converting the mechanical energy of the engine into the electrical energy in the motor/generator and a process of converting the electrical energy of the motor/generator into the mechanical energy in the motor/generator again are involved.

The energy conversion causes a loss in the middle of the conversion processes without outputting all energy and under any driving condition, the fuel efficiency may be excellent in the ENG mode driven only by the engine rather than in the HEV mode.

That is, in the ENG mode 1, when the first and second brakes BK1 and BK2 are engaged with each other and the power of the engine ENG is transferred to the output gear OG through the second rotation shaft TM2. In this case, since the power of the first and second motors/generators MG1 and MG2 is not required, the vehicle is driven by only the power of the engine and since the planetary gear sets are ruled out from the power transfer path, high power transfer efficiency characteristic appears.

[ENG Mode 2]

In the ENG mode 2, when the first clutch CL1 is engaged with the second brake BK2, all the rotation elements TM2, TM4, and TM5 of the second planetary gear set PG2 integrally rotate and the power of the engine ENG is transferred to the output gear OG through the third planetary gear set PG3 and therefore a shift ratio is established as much as the gear ratio of the third planetary gear set PG3.

As described above, according to the first exemplary embodiment of the present invention, in the overall configuration, the two EV modes, the three HEV modes, and the two ENG modes may be implemented by the combination of the three planetary gear sets PG1, PG2, and PG3, the three friction elements BK1, BK2, and CL1, and the two motors/generators MG1 and MG2.

Further, according to the first exemplary embodiment of the present invention, the power of the engine ENG is input to the first ring gear R1 of the first planetary gear set PG1 and the power of the first motor/generator MG1 is input to the first sun gear S1 to transfer a larger torque than the engine ENG torque to the output shaft OS, thereby increasing the usage of the mechanical power transfer path and using the larger power of the engine than the specification of the same first motor/generator MG1.

Further, according to the first exemplary embodiment of the present invention, the larger torque than the engine torque may be transferred to the output shaft to implement the high rotation operation with the large power of the engine at the same vehicle speed at the time of the WOT oscillation and obtain the larger acceleration.

Further, according to the first exemplary embodiment of the present invention, since the larger acceleration in the HEV mode than in the ENG mode may be obtained, a necessity of conversion into the ENG mode at the time of the oscillation is removed to configure a relatively simpler system and reduce the friction element depending on the mode reduction, thereby more increasing the efficiency.

Further, the ENG mode is provided at the time of the high-speed driving to perform the driving without the electrical load of the first and second motors/generators MG1 and MG2, thereby improving the fuel efficiency.

Figure 3:
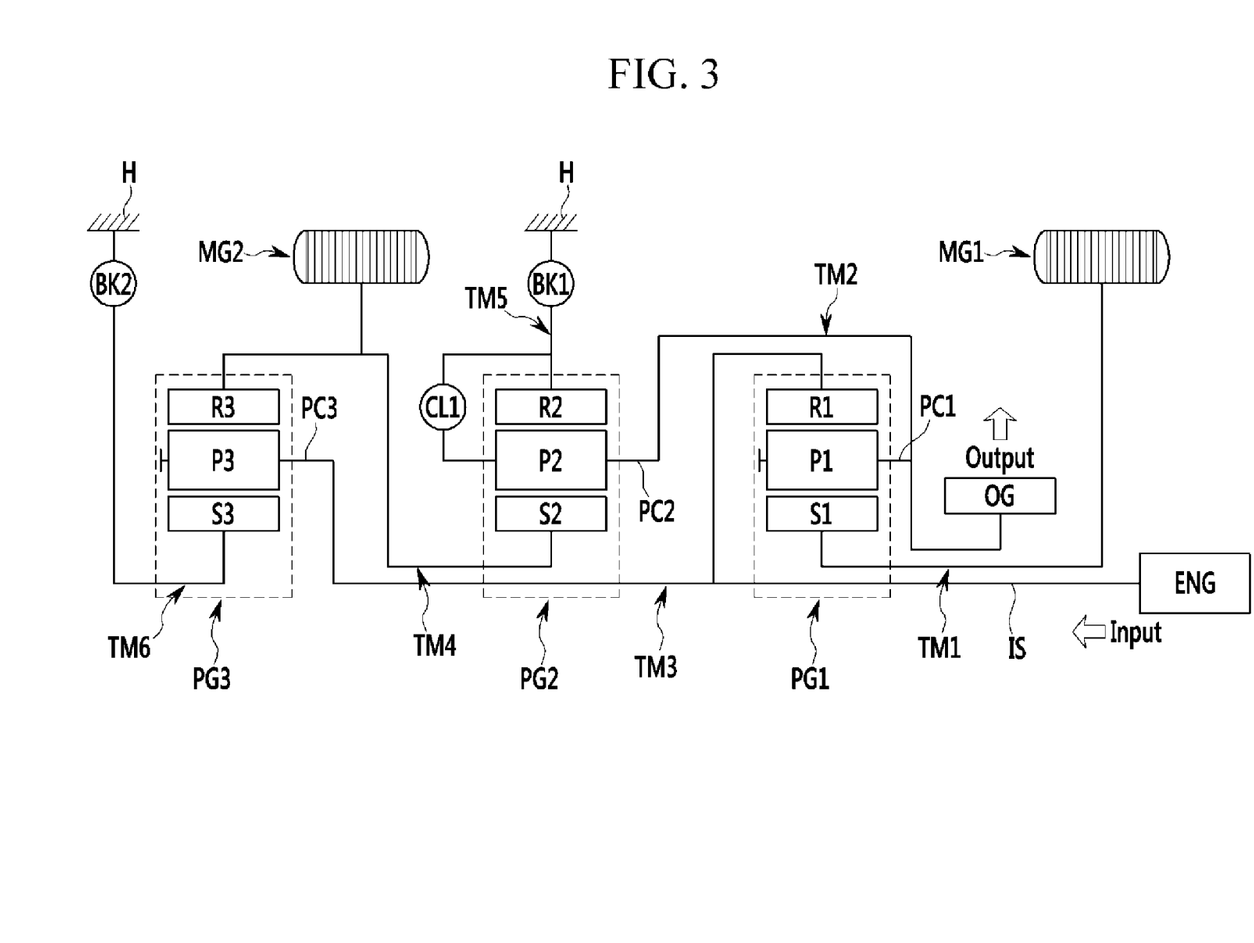
FIG. 3 is a configuration diagram of a power transmission system according to various exemplary embodiments of the present invention.

FIG. 3 is a configuration diagram of a power transmission system according to a second exemplary embodiment of the present invention.

Referring to FIG. 3, according to the first exemplary embodiment of the present invention, the first clutch CL1 which is the direct connection device of the second planetary gear set PG2 is disposed between the fourth rotation shaft TM4 and the fifth rotation shaft TM5 but according to the second exemplary embodiment of the present invention, the first clutch CL1 which is the direction connection device of the second planetary gear set PG2 is disposed between the second rotation shaft TM2 and the fifth rotation shaft TM5.

Compared with the first exemplary embodiment of the present invention, in the case of the second exemplary embodiment of the present invention, only the disposition positions of the first clutch CL1 are different and the operation effect thereof is the same, and therefore the detailed description thereof will be omitted.

Figure 4:
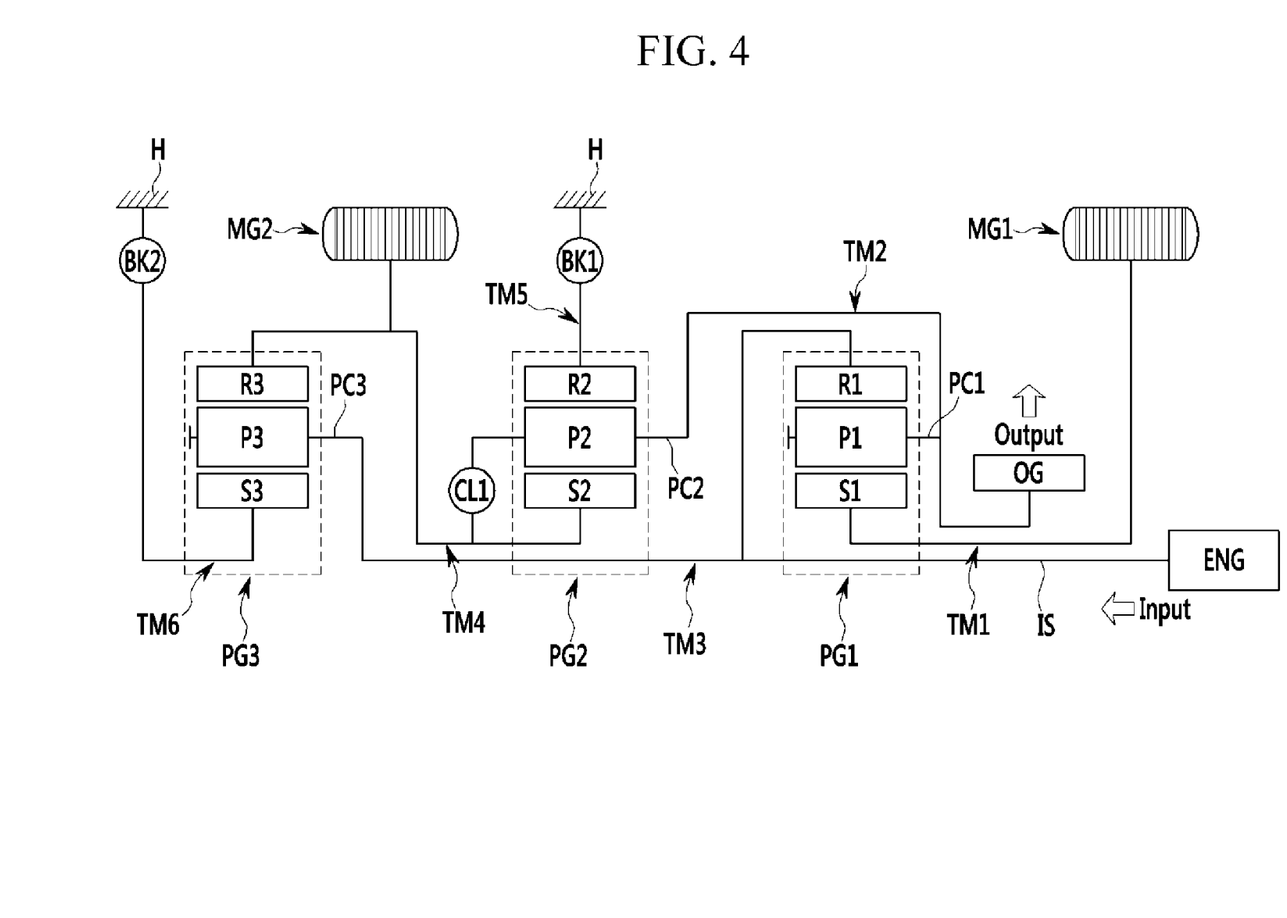
FIG. 4 is a configuration diagram of a power transmission system according to various exemplary embodiments of the present invention.

FIG. 4 is a configuration diagram of a power transmission system according to a third exemplary embodiment of the present invention.

Referring to FIG. 4, according to the first exemplary embodiment of the present invention, the first clutch CL1 which is the direct connection device of the second planetary gear set PG2 is disposed between the fourth rotation shaft TM4 and the fifth rotation shaft TM5 but according to the third exemplary embodiment of the present invention, the first clutch CL1 which is the direction connection device of the second planetary gear set PG2 is disposed between the second rotation shaft TM2 and the fourth rotation shaft TM4.

Compared with the first exemplary embodiment of the present invention, in the case of the third exemplary embodiment of the present invention, only the disposition position of the first clutch CL1 is different and the operation effect thereof is the same, and therefore the detailed description thereof will be omitted.

Figure 5:
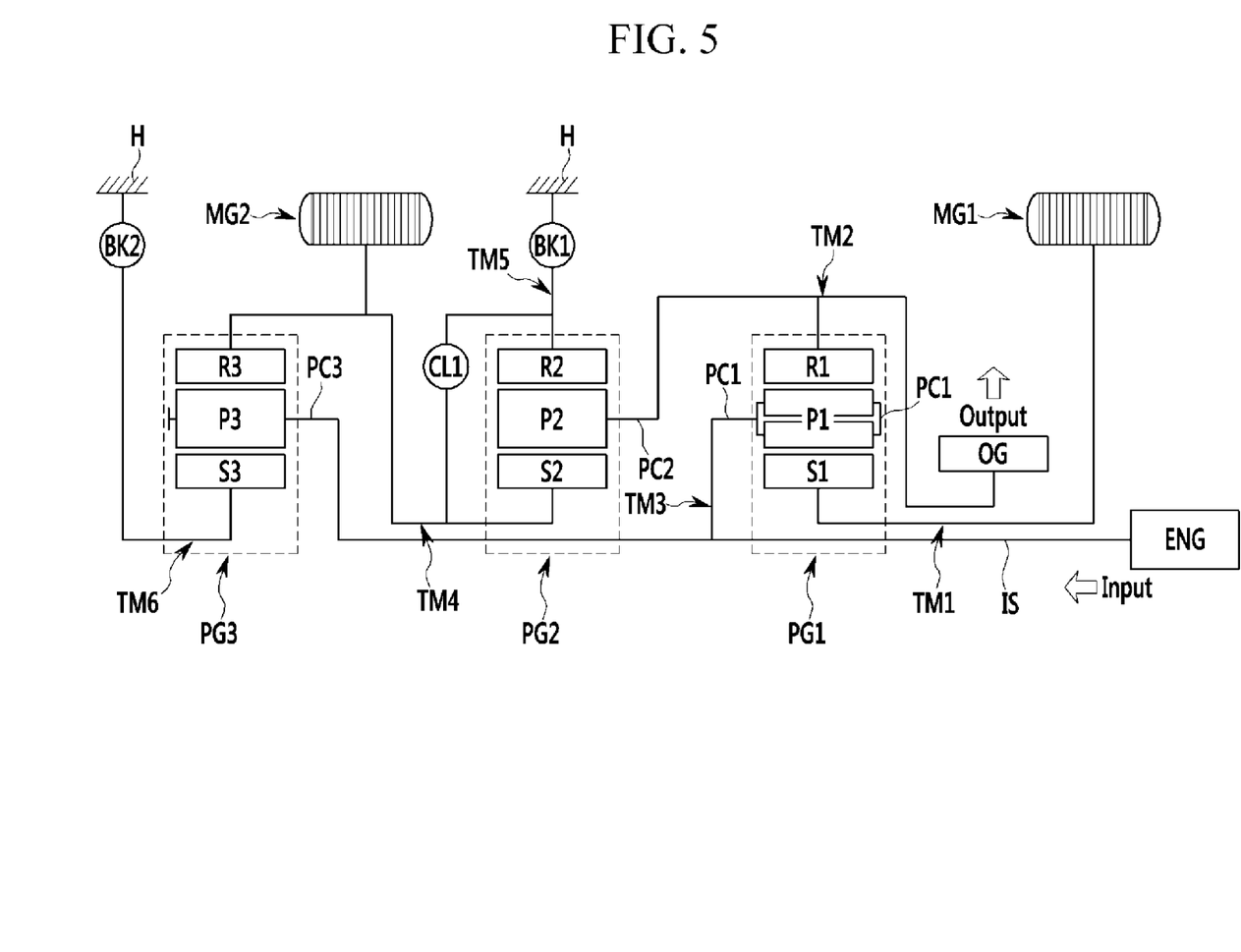
FIG. 5 is a configuration diagram of a power transmission system according to various exemplary embodiments of the present invention.

FIG. 5 is a configuration diagram of a power transmission system according to a fourth exemplary embodiment of the present invention.

Referring to FIG. 5, according to the first exemplary embodiment of the present invention, the first planetary gear set PG1 is configured of the single pinion planetary gear set but according to the fourth exemplary embodiment of the present invention, the first planetary gear set PG1 is configured of the double pinion planetary gear set.

Therefore, the first rotation shaft TM1 associated with the first planetary gear set PG1 is configured to be connected to the first sun gear S1, the second rotation shaft TM2 is configured to connect the first ring gear R1 to the second planetary carrier PC2, and the third rotation shaft TM3 is configured to connect the first planetary carrier PC1 to the third planetary carrier PC3.

Compared with the first exemplary embodiment of the present invention, in the case of the fourth exemplary embodiment of the present invention, only the configurations of the second and third rotation shafts TM2 and TM3 are different and the operation effects thereof are the same, and therefore the detailed description thereof will be omitted.

Figure 6:
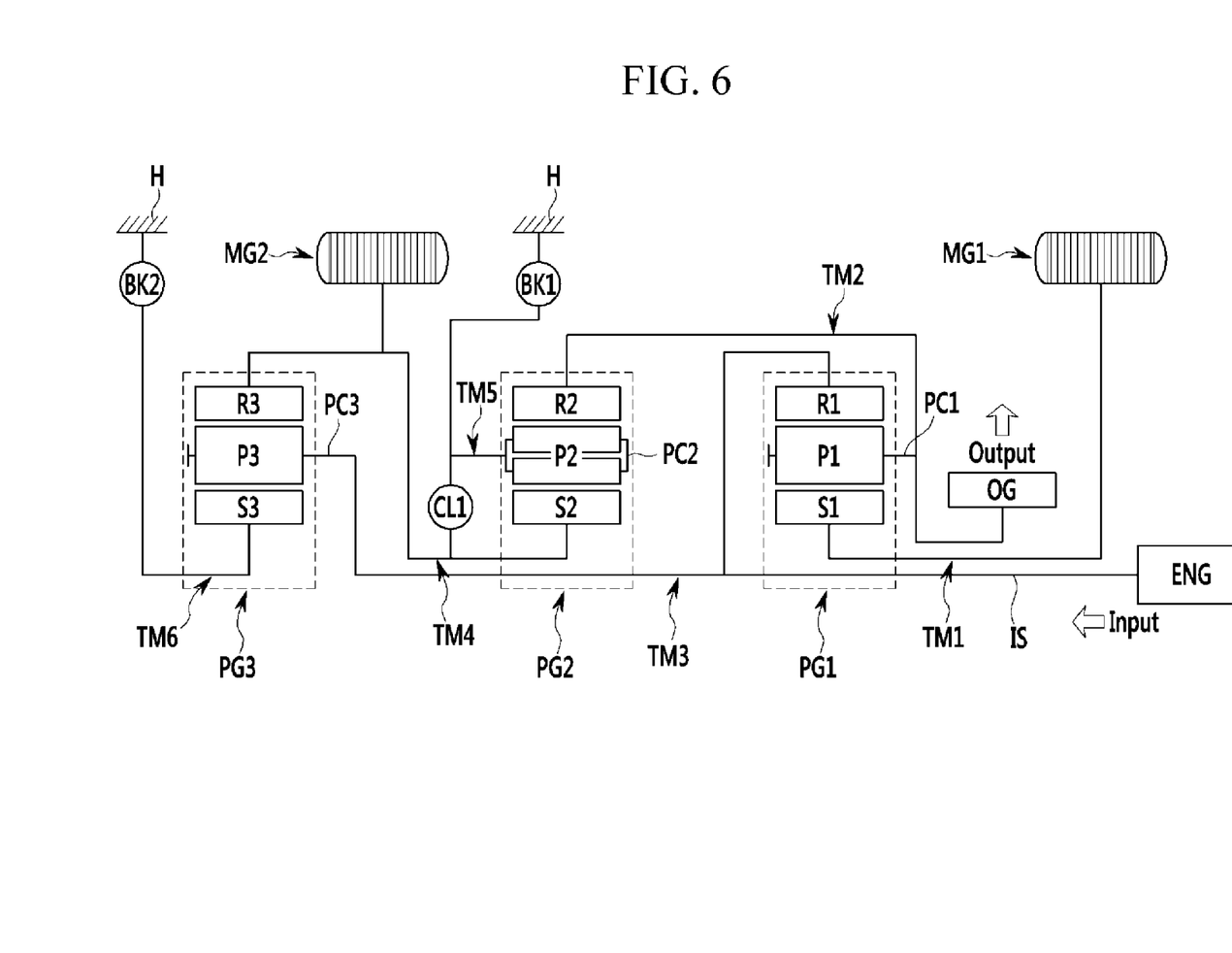
FIG. 6 is a configuration diagram of a power transmission system according to various exemplary embodiments of the present invention.

FIG. 6 is a configuration diagram of a power transmission system according to a fifth exemplary embodiment of the present invention.

Referring to FIG. 6, according to the first exemplary embodiment of the present invention, the second planetary gear set PG2 is configured of the single pinion planetary gear set but according to the fifth exemplary embodiment of the present invention, the second planetary gear set PG2 is configured of the double pinion planetary gear set.

Therefore, the second rotation shaft TM2 associated with the second planetary gear set PG2 is configured to connect the first planetary carrier PC1 to the second ring gear R2, the fourth rotation shaft TM4 is configured to connect the second sun gear S2 to the third ring gear R3, and the fifth rotation shaft TM5 is configured to be connected to the second planetary carrier PC2.

Compared with the first exemplary embodiment of the present invention, in the case of the fifth exemplary embodiment of the present invention, only the configurations of the second and fifth rotation shafts TM2 and TM5 are different and the operation effects thereof are the same, and therefore the detailed description thereof will be omitted.

Figure 7:
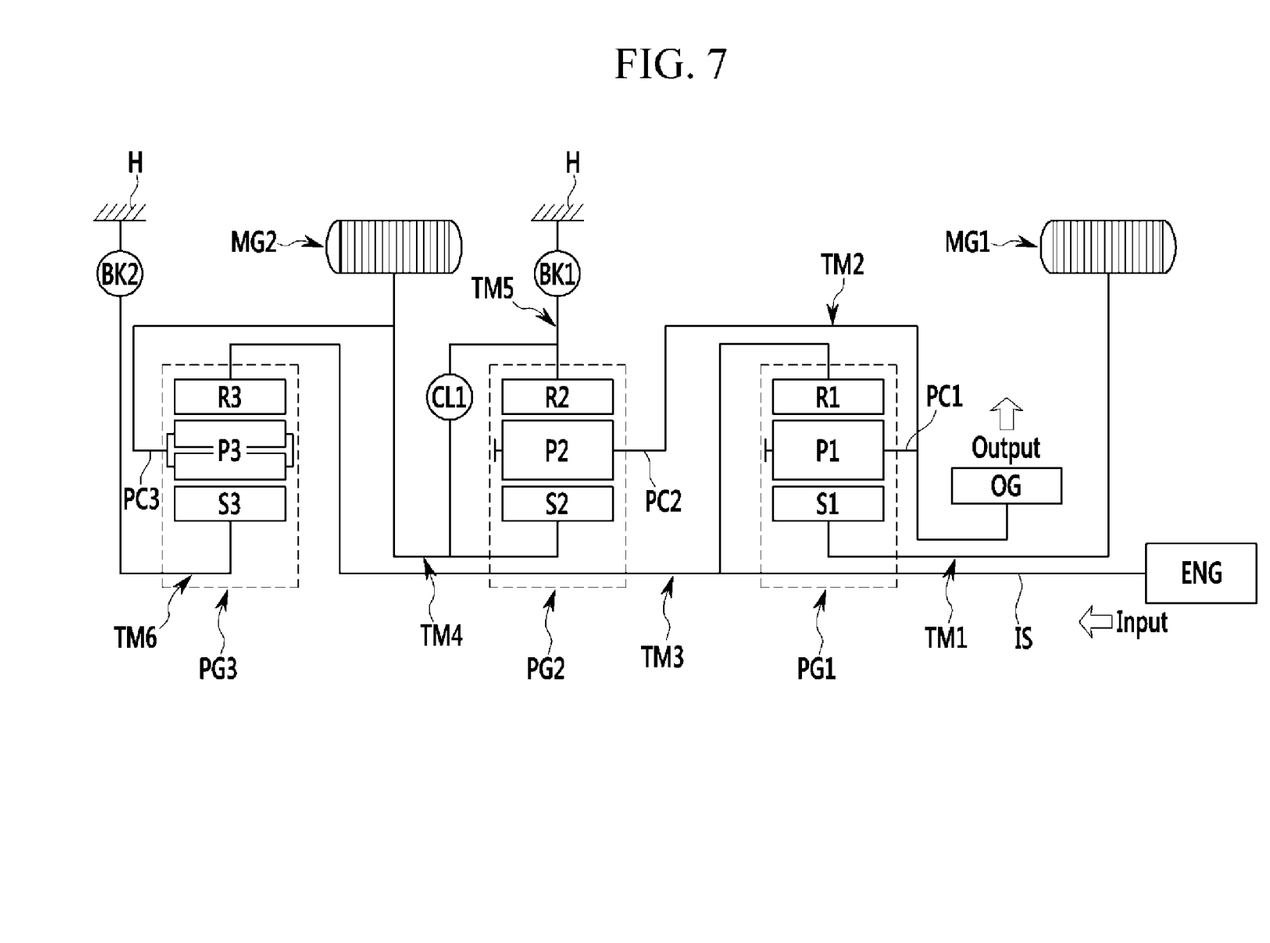
FIG. 7 is a configuration diagram of a power transmission system according to various exemplary embodiments of the present invention.

FIG. 7 is a configuration diagram of a power transmission system according to a sixth exemplary embodiment of the present invention.

Referring to FIG. 7, according to the first exemplary embodiment of the present invention, the third planetary gear set PG3 is configured of the single pinion planetary gear set but according to the sixth exemplary embodiment of the present invention, the third planetary gear set PG3 is configured of the double pinion planetary gear set.

Therefore, the third rotation shaft TM3 associated with the third planetary gear set PG3 is configured to connect the first ring gear R1 to the third ring gear R3, the fourth rotation shaft TM4 is configured to connect the second sun gear S2 to the third planetary carrier PC3, and the sixth rotation shaft TM6 is configured to be connected to the third sun gear S3.

Compared with the first exemplary embodiment of the present invention, in the case of the sixth exemplary embodiment of the present invention, only the configurations of the third and fourth rotation shafts TM3 and TM4 are different and the operation effects thereof are the same, and therefore the detailed description thereof will be omitted.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A power transmission system of a hybrid electric vehicle, comprising:
   an input shaft input with power of an engine;
   an output gear disposed on the input shaft without rotation interference;
   a first planetary gear set disposed on the input shaft while including three rotation elements having a first sun gear, a first planetary carrier, and a first ring gear;
   a second planetary gear set disposed on a same shaft line as the first planetary gear set while including three rotation elements having a second sun gear, a second planetary carrier, and a second ring gear;
   a third planetary gear set disposed on a same shaft line as the second planetary gear set while including three rotation elements having a third sun gear, a third planetary carrier, and a third ring gear;
   a first rotation shaft configured to directly connect one of the rotation elements of the first planetary gear set to a first motor and generator;
   a second rotation shaft directly connected to the output gear while directly connecting one of the rotation elements of the first planetary gear set ruled out from the rotation elements connected to the first rotation shaft to one of the rotation elements of the second planetary gear set;
   a third rotation shaft directly connected to the input shaft while directly connecting one of the rotation elements of the first planetary gear set ruled out from the rotation elements connected to the first rotation shaft or the second rotation shaft to one of the rotation elements of the third planetary gear set;
   a fourth rotation shaft directly connected to a second motor and generator while directly connecting one of the rotation elements of the second planetary gear set ruled out from the rotation elements connected to the second rotation shaft to one of the rotation elements of the third planetary gear set ruled out from the rotation elements connected to the third rotation shaft;
   a fifth rotation shaft connected to one of the rotation elements of the second planetary gear set ruled out from the rotation elements connected to the second rotation shaft or the fourth rotation shaft to be selectively connected to a transmission housing;
   a sixth rotation shaft connected to one of the rotation elements of the third planetary gear set ruled out from the rotation elements connected to the third rotation shaft or the fourth rotation shaft to be connected to the transmission housing; and
   three friction elements configured to selectively connect the respective rotation shafts to each other or selectively connect the respective rotation shafts to the transmission housing.

2. The power transmission system of claim 1, wherein all of the first, second, and third planetary gear sets are a single pinion planetary gear set and include:
   the first rotation shaft configured to directly connect the first sun gear to the first motor and generator;
   the second rotation shaft connected to the output gear while directly connecting the first planetary carrier to the second planetary carrier;
   the third rotation shaft connected to the input shaft while directly connecting the first ring gear to the third planetary carrier;
   the fourth rotation shaft connected to the second motor and generator while directly connecting the second sun gear to the third ring gear;
   the fifth rotation shaft connected to the second ring gear; and
   the sixth rotation shaft connected to the third sun gear.

3. The power transmission system of claim 1, wherein the three friction elements include:
   a first brake configured to selectively connect the fifth rotation shaft to the transmission housing;
   a second brake configured to selectively connect the sixth rotation shaft to the transmission housing; and
   a first clutch being a direct connection device of the second planetary gear set and configured to selectively connect the fourth rotation shaft to the fifth rotation shaft.

4. The power transmission system of claim 1, wherein the three friction elements include:
   a first brake configured to selectively connect the fifth rotation shaft to the transmission housing;
   a second brake configured to selectively connect the sixth rotation shaft to the transmission housing; and
   a first clutch being a direct connection device of the second planetary gear set and configured to selectively connect the second rotation shaft to the fifth rotation shaft.

5. The power transmission system of claim 1, wherein the three friction elements include:
   a first brake configured to selectively connect the fifth rotation shaft to the transmission housing;
   a second brake configured to selectively connect the sixth rotation shaft to the transmission housing; and
   a first clutch being a direct connection device of the second planetary gear set and selectively connect the second rotation shaft to the fourth rotation shaft.

6. The power transmission system of claim 1, wherein the first planetary gear set is a double pinion planetary gear set and the second and third planetary gear sets are a single pinion planetary gear set and the first, second, and third planetary gear sets include:
   the first rotation shaft configured to directly connect the first sun gear to the first motor and generator;
   a second rotation shaft connected to the output gear while directly connecting the first ring gear to the second planetary carrier;
   a third rotation shaft connected to the input shaft while directly connecting the first planetary carrier to the third planetary carrier;
   the fourth rotation shaft connected to the second motor and generator while directly connecting the second sun gear to the third ring gear;
   the fifth rotation shaft connected to the second ring gear; and
   the sixth rotation shaft connected to the third sun gear.

7. The power transmission system of claim 1, wherein the first and third planetary gear sets are a single pinion planetary gear set and the second planetary gear set is a double pinion planetary gear set and the first, second, and third planetary gear sets include:
   the first rotation shaft configured to directly connect the first sun gear to the first motor and generator;
   the second rotation shaft connected to the output gear while directly connecting the first planetary carrier to the second ring gear;
   the third rotation shaft connected to the input shaft while directly connecting the first ring gear to the third planetary carrier;
   the fourth rotation shaft connected to the second motor and generator while directly connecting the second sun gear to the third ring gear;
   the fifth rotation shaft connected to the second planetary carrier; and
   the sixth rotation shaft connected to the third sun gear.

8. The power transmission system of claim 1, wherein the first and second planetary gear sets are a single pinion planetary gear set and the third planetary gear set is a double pinion planetary gear set and the first, second, and third planetary gear sets include:
the first rotation shaft configured to directly connect the first sun gear to the first motor and generator;
the second rotation shaft connected to the output gear while directly connecting the first planetary carrier to the second planetary carrier;
the third rotation shaft connected to the input shaft while directly connecting the first ring gear to the third ring gear;
the fourth rotation shaft connected to the second motor and generator while directly connecting the second sun gear to the third planetary carrier;
the fifth rotation shaft connected to the second ring gear; and
the sixth rotation shaft connected to the third sun gear.

9. A power transmission system of a hybrid electric vehicle, comprising:
an input shaft input with power of an engine;
an output gear disposed on the input shaft without rotation interference;
a first planetary gear set being a single pinion planetary gear set and disposed on the input shaft while including three rotation elements having a first sun gear, a first planetary carrier, and a first ring gear;
a second planetary gear set being the single pinion planetary gear set and disposed on a same shaft line at a rear side of the first planetary gear set while including three rotation elements having a second sun gear, a second planetary carrier, and a second ring gear;
a third planetary gear set being the single pinion planetary gear set and disposed on a same shaft line at a rear side of the second planetary gear set while including three rotation elements having a third sun gear, a third planetary carrier, and a third ring gear;
a first rotation shaft configured to directly connect the first sun gear to a first motor and generator;
a second rotation shaft connected to the output gear while directly connecting the first planetary carrier to the second planetary carrier;
a third rotation shaft connected to the input shaft while directly connecting the first ring gear to the third planetary carrier;
a fourth rotation shaft connected to a second motor and generator while directly connecting the second sun gear to the third ring gear;
a fifth rotation shaft connected to the second ring gear to be selectively connected to a transmission housing;
a sixth rotation shaft connected to the third sun gear to be selectively connected to the transmission housing; and
three friction elements configured to selectively connect the respective rotation shafts to each other or selectively connect the respective rotation shafts to the transmission housing.

10. The power transmission system of claim 9, wherein the three friction elements include:
a first brake configured to selectively connect the fifth rotation shaft to the transmission housing;
a second brake configured to selectively connect the sixth rotation shaft to the transmission housing; and
a first clutch being a direct connection device of the second planetary gear set and configured to selectively connect the fourth rotation shaft to the fifth rotation shaft.

11. The power transmission system of claim 9, wherein three friction elements include:
a first brake configured to selectively connect the fifth rotation shaft to the transmission housing;
a second brake configured to selectively connect the sixth rotation shaft to the transmission housing; and
a first clutch being a direct connection device of the second planetary gear set and configured to selectively connect the second rotation shaft to the fifth rotation shaft.

12. The power transmission system of claim 9, wherein the three friction elements include:
a first brake configured to selectively connect the fifth rotation shaft to the transmission housing;
a second brake configured to selectively connect the sixth rotation shaft to the transmission housing; and
a first clutch being a direct connection device of the second planetary gear set and selectively connect the second rotation shaft to the fourth rotation shaft.

13. A power transmission system of a hybrid electric vehicle, comprising:
an input shaft input with power of an engine;
an output gear disposed on the input shaft without rotation interference;
a first planetary gear set being a double pinion planetary gear set and disposed on the input shaft while including three rotation elements having a first sun gear, a first planetary carrier, and a first ring gear;
a second planetary gear set being a single pinion planetary gear set and disposed on a same shaft line at a rear side of the first planetary gear set while including three rotation elements having a second sun gear, a second planetary carrier, and a second ring gear;
a third planetary gear set being the single pinion planetary gear set and disposed on a same shaft line at a rear side of the second planetary gear set while including three rotation elements having a third sun gear, a third planetary carrier, and a third ring gear;
a first rotation shaft configured to directly connect the first sun gear to a first motor and generator;
a second rotation shaft connected to the output gear while directly connecting the first ring gear to the second planetary carrier;
a third rotation shaft connected to the input shaft while directly connecting the first planetary carrier to the third planetary carrier;
a fourth rotation shaft connected to a second motor and generator while directly connecting the second sun gear to the third ring gear;
a fifth rotation shaft connected to the second ring gear to be selectively connected to a transmission housing;
a sixth rotation shaft connected to the third sun gear to be selectively connected to the transmission housing; and
three friction elements configured to selectively connect the respective rotation shafts to each other or selectively connect the respective rotation shafts to the transmission housing.

14. The power transmission system of claim 13, wherein the three friction elements include:
a first brake configured to selectively connect the fifth rotation shaft to the transmission housing;
a second brake configured to selectively connect the sixth rotation shaft to the transmission housing; and
a first clutch being a direct connection device of the second planetary gear set and configured to selectively connect the fourth rotation shaft to the fifth rotation shaft.

* * * * *